March 22, 1932. H. A. ROE 1,850,896
CABLE SECURING MEANS
Filed July 23, 1930
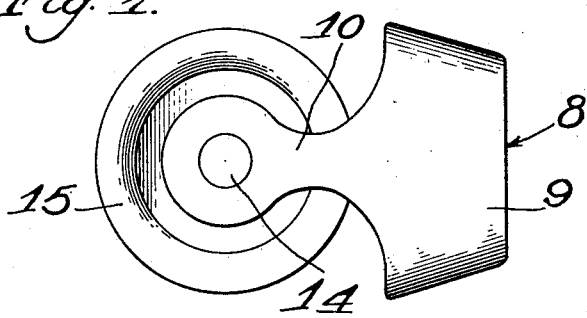
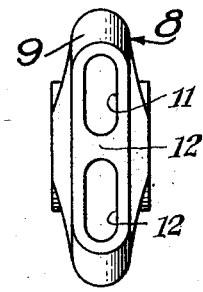
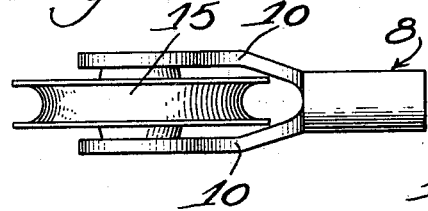
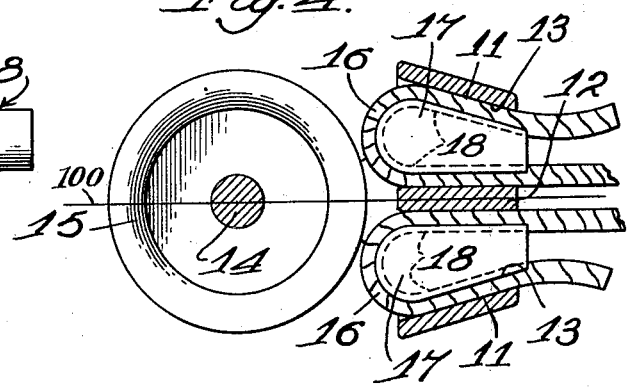
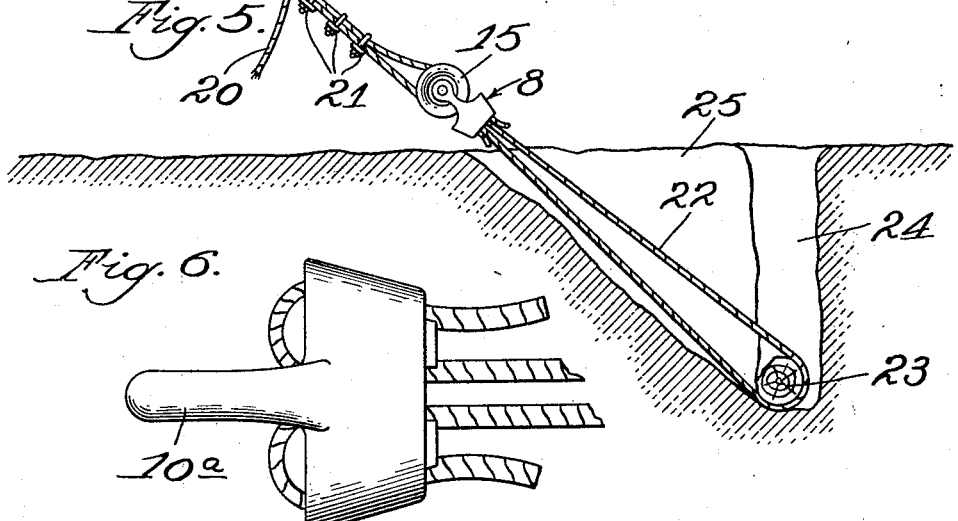
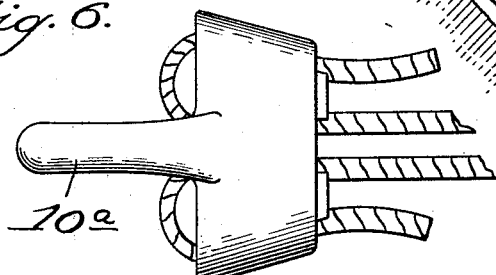
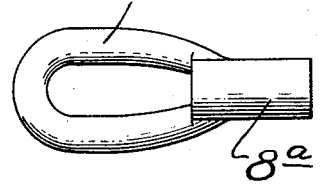
Inventor.
Harry A. Roe.
By Dyrenforth, Lee, Chritton and Wiles
Atty's.

Patented Mar. 22, 1932

1,850,896

UNITED STATES PATENT OFFICE

HARRY A. ROE, OF CHICAGO, ILLINOIS, ASSIGNOR TO SAUERMAN BROS. INC., OF CHICAGO, ILLINOIS, A CORPORATION OF ILLINOIS

CABLE SECURING MEANS

Application filed July 23, 1930. Serial No. 470,153.

My invention relates to improvements in cable securing devices for securing either the two ends of a looped cable, as for example, forming a sling, or an end of each of two cables.

One of my objects is to provide a structure of the general character above referred to which shall be of strong, durable and economical construction, and which will avoid the necessity of fastening the cable at an end free of the securing means, by other means such as cable clips or clamps.

Another object is to provide such a structure adapted for the ready and convenient connection therewith of the ends of a cable or ends of cables to be attached thereto and the ready and convenient disconnecting therefrom of the cable ends and without danger of impairing the structure or diminishing its effectiveness because of unskilled application.

Another object is to provide a new and improved means for anchoring guy cables and the like and comprising cable slings and by the use of which cable clamps, or clips, for the slings, with the objections attended in their use, is avoided; and other objects as will be manifest from the following description.

Referring to the accompanying drawings:

Figure 1 is a side view of the plural socketed member of one form of my improved means.

Figure 2 is an end view thereof.

Figure 3 is an edge view thereof.

Figure 4 is a longitudinal sectional view in part of the structure of the preceding figures showing cable-ends secured in place therein.

Figure 5 is a broken view in side elevation of a guy cable construction secured in place by means embodying my invention, the member, such as a deadman located in the ground and to which the guy cable structure is anchored, and also the ground at which the deadman is located, being shown in section.

Figure 6 is a view in side elevation of a modified form of the plural socketed member; and Figure 7, an edge view thereof.

Referring to Figs. 1 to 4, inclusive, these figures illustrate a double wedge socket structure constituting a desirable embodiment of my invention particularly where used as an element of the anchor for a guy cable as for example in derrick construction.

The double wedge socket structure illustrated comprises a member 8 which may be and preferably is an integral casting presenting a body portion 9 and spaced apart ears 10 at one end thereof. The body portion 9 contains, at opposite sides of its median line, a pair of openings 11 extending therethrough and forming sockets, these openings being separated by a web portion 12 of the body 9 forming one side of each socket the opposite side of each of which and represented at 13 inclines toward the median line of the body 9 as shown in Fig. 4 thereby causing these sockets to be of tapered form.

The ears 10 support a pin 14 on which a thimble sheave 15 positioned between the ears 10 is journalled.

The sockets 13 are provided to receive cable ends which may be either the ends of a single cable or ends of separate cables, these cable-ends being bent into the form of loops 16 at which they extend in the sockets 11. The cable ends are securely anchored in the sockets by wedging means positioned within the loops 16, these wedging means being preferably in the form of wedges 17 as for example of cast steel and of such size and shape, as shown, that when force is exerted tending to pull the cable ends from the sockets 11, the looped portions 16 of the cable-ends will be firmly wedged against the inner walls of the sockets, it being preferred that the edges of the wedges 17 against which the cable loops 16 extend, be grooved to conformingly fit the cable-ends which they oppose as represented at 18.

In Fig. 5 I have shown the structure of Figs. 1-4 as constituting an element of the anchor for a guy cable. In this arrangement the guy cable is represented at 19 and extends about the pulley 15, the loose end 20 of the guy cable being connected with the adjacent portion of the latter as by cable clamps represented at 21.

The socket structure 8 in this arrangement is a part of the anchor means for the cable 19 and is connected at its socket portion, and by means of the wedges 17 as above described, with the ends of a single cable 22 bent to form a sling cable engaging an anchor shown as in the form of a deadman 23 extending through the lower loop of the sling cable 22 and located in a cut 24 in the earth intersected by a cut 25 extending transversely of the cut 24 between the ends of the latter and in which the sling cable 22 extends, the wall of the cut 24 at opposite sides of the cut 25 forming abutments for the end of the deadman 23.

It will be understood from the foregoing that the cable ends may be readily secured to the socket structure 8 without requiring the use of any special tools and by unskilled labor and disconnected with ease from the socket structure 8 as desired either for the purpose of permanent disassembly or adjustment of the cable-ends therein, and repeated adjustments of the cable-ends in the socket structure effected without danger of damaging the cables, this being of particular value in connection with a derrick guy or the like which requires frequent removal of the sling cable from one anchor to another and where, because of the hazard to life and limb, it is desirable that such removal and re-location, may not damage or impair the fastenings of the cables, it being apparent that either or both of the cable ends may be quickly disconnected from the socket structure 8 by driving the socket member 8 from the wedges.

Furthermore, the structure 8 may be manufactured economically and is rigid and durable.

My invention is capable of use in other arrangements than that shown in Fig. 5 and of embodiment in other forms of structure. In certain structures the use of the sheave 15 would be dispensed with and the pin 14 retained as a means of attaching the socket structure to other objects such as links, turnbuckles, thimbles, and the like, depending upon the particular arrangement in which the socket member is to be used.

If desired, the socket structure when provided for use not requiring a sheave journalled thereon may be cast with a loop at the end thereof corresponding with the end of the structure provided with the ears 10 in Figs. 1-5. In Figs. 6 and 7 such a structure is illustrated the socket member of which and corresponding with the socket member 8, is represented at 8ª and is formed integrally with a looped portion 10ª affording a point of attachment of the socket member to other objects as above referred to.

It will be noted that in accordance with the preferred illustrated embodiment of my invention the sockets 12 are radially and symmetrically disposed relative to the axis of loading of the plural socket member 8 and represented by the line 100 in Fig. 4, and that the portions of the cable 22 which are placed under tension, namely, those portions which reach to the deadman 23 in the construction shown, are, by reason of the relatively thin wall 12 of the member 8, caused to extend substantially coincident with the axis 100. Thus I substantially avoid eccentric loading of the securing means comprising the member 8 with its portion for attachment to a tension element, exemplified in Figs. 1-5 by the sheave 15 and the element 19, and in Figs. 6 and 7 by the loop 10ª and the tension element which in use would be attached thereto, in the event of unbalanced loading of the cable ends secured in the sockets of the plural socket member.

While I have illustrated and described certain embodiments of my invention, I do not wish to be understood as intending to limit it thereto as the same may be variously modified and altered without departing from the spirit of my invention.

What I claim as new, and desire to secure by Letters Patent, is:

In combination a guy cable, a sling cable for anchoring said guy cable, a member containing a plurality of tapering sockets into which the ends of the sling cable, in looped condition, extend, wedging means located within the looped portions of said cable-ends for wedging the latter against the side walls of said sockets, and a sheave journalled on said member and with which said guy cable is engaged.

HARRY A. ROE.